UNITED STATES PATENT OFFICE.

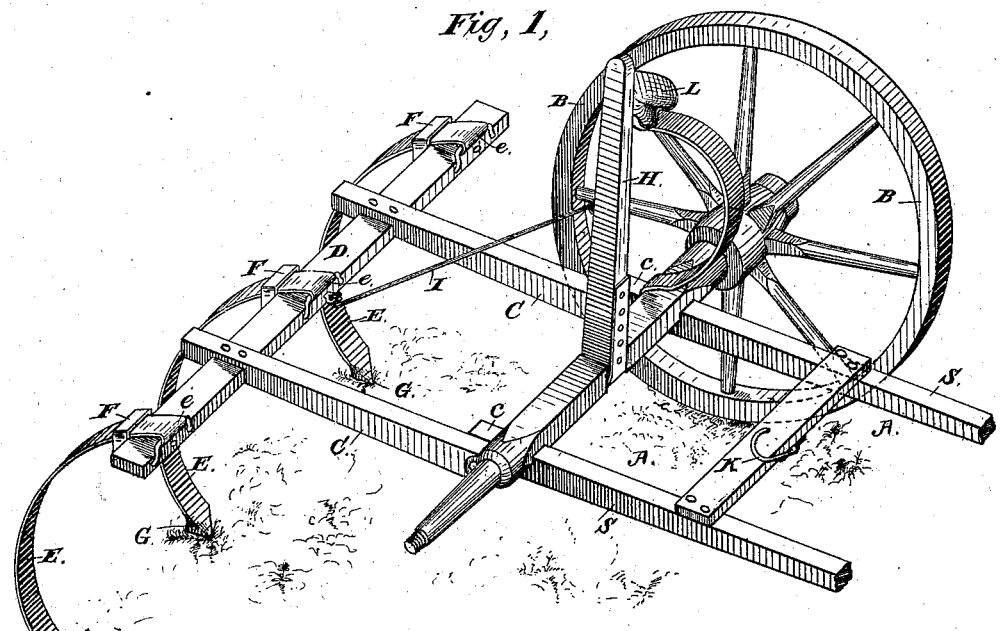
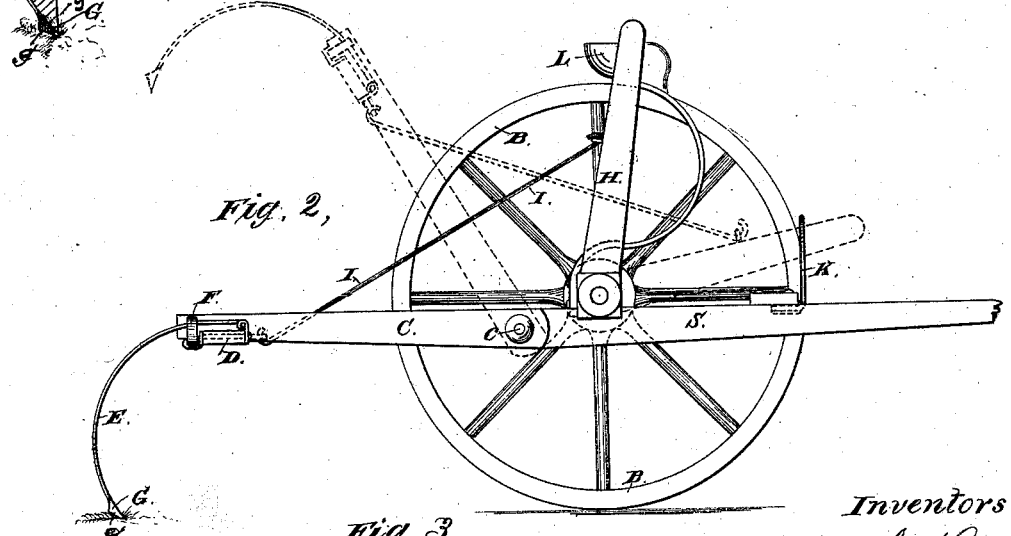
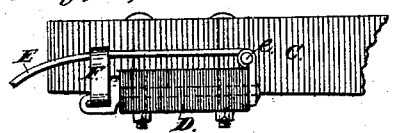

WILLIAM J. KRAMER AND LEWIS MILLER, OF OIL CITY, PENNSYLVANIA.

LAND-MARKER.

SPECIFICATION forming part of Letters Patent No. 224,929, dated February 24, 1880.

Application filed May 14, 1879.

*To all whom it may concern:*

Be it known that we, WILLIAM JOHN KRAMER and LEWIS MILLER, both of Oil City, in the county of Venango and State of Pennsylvania, have invented an improved scorer for marking off land for corn or other crops, of which the following is a specification.

The machine is constructed with flat steel teeth hinged to a horizontal bar which is attached by hinged arms to the rear of a sulky, and extends laterally to a sufficient length to carry teeth for marking any desirable number of rows at one operation. The teeth are formed with share-like points, and are held down to their work by endless gum springs, of simple and cheap form, encircling their necks back of their hinge attachments, as hereinafter more fully set forth.

In order that the invention may be fully understood, we will proceed to describe it with reference to the accompanying drawings, in which—

Figure 1 is a perspective view of the machine with one wheel removed. Fig. 2 is a side view of the same, one wheel being removed to show the scorer-frame in two positions.

A represents a sulky having wheels B B. To the rear end of the shafts S, at $c\ c$, are hinged arms C C, to the extremities of which is fixed a horizontal bar, D, back of the wheels B B, extending laterally to any necessary length, and carrying scorer-teeth E E E, which are formed of springs of flat steel, or its equivalent, hinged at $e$ in loops on the forward edge of the bar D, and encircled, some distance in rear of their hinges, by rubber bands or rings F F F, which are attached to suitable eyes underneath the bar D, and serve as springs to hold the teeth E down to their work.

The marker-teeth are curved downward, and are flat nearly their entire length, as shown, and the lower extremities are provided with shares G, formed by turning back the corners, as shown at $g\ g$, for the purpose of making a shallow mark or furrow for the reception of the grain.

The mode of hinging the teeth to the carrying-bar and holding them down to their work by means of rubber-band springs adapts them to work independently, so that in running over a ridge or any obstacle in the way either tooth will rise freely without interfering with the work of the others or preventing them from making their regular marks or furrows in the ground.

The depth of the mark or furrow is regulated by simply straightening or curving the marker-teeth. The more they are curved the deeper will be the furrow, and vice versa. This graduation is easily effected by the user of the implement, as the marker-teeth are made of soft steel untempered.

The marker-frame is raised or lowered, at the will of the operator, by means of a hand-lever, H, connected to said frame by a rod, I, and held up by a simple catch, K.

L represents the driver's seat, to which the operating-lever H is in convenient proximity.

Having thus described our invention, the following is what we claim as new therein and desire to secure by Letters Patent:

1. The curved marker-tooth E, constructed of a flat steel bar with a hinge-loop, $e$, at its upper end, and at its lower end a share, G, formed by turning back the corners of the bar in the form of wings $g\ g$, as shown and described.

2. In a land-marker, the combination of the curved flat steel teeth E, formed with loops $e$ and shares G $g\ g$, as aforesaid, the bar D, having said teeth hinged to its front edge, and the springs F, connected, as shown, to the rear edge of the bar and encircling the necks of the teeth.

W. J. KRAMER.
LEWIS MILLER.

Witnesses:
F. W. HAYS,
A. M. KRAMER.